United States Patent Office 3,437,653
Patented Apr. 8, 1969

3,437,653
PROCESS FOR THE MANUFACTURE OF PHOSPHORIC ESTERS OF CARBOHYDRATES AND OF POLYHYDRIC ALCOHOLS
John Hedley Curtin, Turramurra, New South Wales, and Julian Gagolski, Chatswood, New South Wales, Australia, assignors to The Colonial Sugar Refining Company, Sydney, New South Wales, Australia
No Drawing. Continuation-in-part of application Ser. No. 584,648, Oct. 6, 1966. This application July 13, 1967, Ser. No. 653,043
Int. Cl. C08b 5/00
U.S. Cl. 260—234
15 Claims

ABSTRACT OF THE DISCLOSURE

The invention involves a process for the manufacture of phosphoric esters of carbohydrates and polyhydric alcohols in which the carbohydrate or polyhydric alcohol is mixed in water with an inorganic calcium oxy-compound and phosphorylated at reduced temperature with phosphorous oxychloride, the carbohydrate or polyhydric alcohol, the inorganic calcium oxy-compound and the phosphorous oxychloride being employed in the molar ratios 1:2.5:1.

---

The present invention is a continuation-in-part of United States Ser. No. 584,648, filed Oct. 6, 1966, which in turn is a continuation of United States Patent Application Ser. No. 262,230 filed Mar. 1, 1963, and both now abandoned.

Various processes have been used for the preparation of phosphoric esters of carbohydrates and of polyhydric alcohols.

Neuberg and Pollak (Biochemische Zeitschrift No. 23, February 1910, pp. 515–517) described a method for the preparation of glucose and sucrose monophosphoric esters by the action of phosphorus oxychloride on aqueous solutions of the sugars. This method was also the subject of German patent specification No. 247,809 (filed Feb. 3, 1910). A schematic outline of this method is as follows:

A solution of phosphorus oxychloride (77 grams; 0.5 mole) in alcohol-free chloroform (250 ml.) was slowly added to an ice-cold solution of sucrose (180 grams; 0.53 mole) in water (2,000 ml.) in which calcium oxide (115 grams; 2.05 moles) had been slaked and suspended. After stirring for several hours, the solution was filtered and carbon dioxide was passed into the filtrate to remove excess calcium oxide as carbonate. The filtered solution was then concentrated and added to alcohol to precipitate a calcium sucrose phosphate product containing calcium chloride. To obtain a product free from calcium chloride, this precipitated material was dissolved in water and precipitated with alcohol five or six times.

The yield of calcium sucrose monophosphate was approximately one third of the weight of sucrose used. The equation for the reaction was given as:

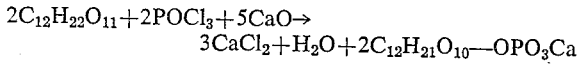

From this equation, the above mentioned yield of calcium sucrose monophosphate can be calculated as approximately 25% of theoretical.

It was stated that it was desirable to use an excess of calcium oxide above the stoichiometric quantities represented in the equation.

The present invention has for its object an improved process of manufacture of the phosphoric esters of carbohydrates or of polyhydric alcohols which gives good yields and simplifies the recovery of the salts of these esters in a pure state.

We have found that by using the stoichiometric amount of inorganic calcium oxy-compound (calcium oxide or calcium hydrooxide or calcium carbonate) in the above described process rather than an excess, there is no necessity for treating the filtrate with carbon dioxide to remove excess calcium. Moreover, when the above mentioned reaction is carried out under these conditions the yield of calcium salts of sucrose monophosphoric esters can be increased from approximately 25% of theoretical (by the known method) to as high as approximately 80% of theoretical. Similar increases in yields of products are obtained when other carbohydrates or polyhydric alcohols are phosphorylated under these conditions.

We have also found that the solvent for phosphorus oxy-chloride need not be restricted to chloroform (which normally needs to be treated to free it of alcohol impurity before it can be used), but may be any chlorinated hydrocarbon solvent. Advantageously, the chlorinated hydrocarbon solvent can be trichloroethylene. When trichloroethylene is used to dissolve the phosphorus oxychloride, which solution is then used in the phosphorylation reaction, the process is simplified, and recovery of the solvent facilitated. It is now known that the phosphorylation reaction can be carried out advantageously when phosphorus oxy-chloride is introduced in the absence of a solvent as disclosed in the co-pending United States patent application 613,619, filed Feb. 2, 1967 (Campbell et al.). Example 1 of the copending application, which clearly indicates that the new and useful features of the present invention can be defined without reference to a solvent for phosphorus oxychloride, is set out below.

This example illustrates the unexpected improvement in yield which is obtained by carrying out the phosphorylation reaction by the introduction of a liquid consisting essentially of POCl$_3$ as compared with prior methods wherein POCl$_3$ was introduced in a chlorinated solvent such as trichloroethylene.

In this example the reactor was an agitated stainless steel vessel immersed in a Dry Ice-isopropanol bath. Refined cane sugar in the amount of 3.64 moles was dissolved in 623 milliliters of hot water which was then cooled to 25° C. A slurry containing 8.89 moles of calcium hydroxide in 3,220 milliliters of water was then prepared and transferred into the reactor. Agitation of the reactor was begun and the sugar solution was then transferred thereto. The resulting slurry was then cooled to 5° C. POCl$_3$ liquid in the amount of 537 g. (3.5 moles) was then added to the agitated reaction mass over a period of about 2 hours while maintaining the temperature between 3 to 7° C. Upon completion of the POCl$_3$ addition, the cooling bath was removed and agitation of the mass was continued for about one hour. The pH of the slurry was checked and found to be about 9 to 10, at which time the mass was discharged and weighed. In a related experiment, 537 grams (3.5 moles) of POCl$_3$ were dissolved in an equal weight of trichloroethylene. The trichloroethylene-POCl$_3$ mixture was then added to the reaction mass under the same procedure as described above. Each product solution was recovered in the same manner by ethanol precipitation and repeated ethanol leachings. It was found that the yield of the desired product was about 10% higher in the case where POCl₃ was added alone as compared with the case where a chlorinated solvent was employed. Comparative yield figures are shown below in Table 1.

Table 1

|  | Pounds[1] |
|---|---|
| TCE used | 0.79 |
| TCE not used | 0.87 |

[1] Pounds of phosphate containing product per pound of sucrose on a dry basis.

The analysis of the products prepared in this manner is shown below in Table 2.

TABLE 2

|  | Percent | | | CaCl₂ |
|---|---|---|---|---|
|  | Ca | P total | P inorg. |  |
| TCE used | 12.1 | 9.4 | 2.8 | 0.55 |
| TCE not used | 10.6 | 9.1 | 2.0 | 0.55 |

The recovery of the calcium salt of the phosphate ester from the reaction medium may be carried out in a variety of ways. The method of precipitation by alcohol followed by repeated dissolution in water and alcohol precipitation as described in German patent specification No. 247,809, may be used.

We have found, however, that on a commercial scale of manufacture, more economical use of alcohol may be achieved by countercurrent extraction of the product with alcohol or an aqueous alcohol solution to remove the calcium chloride.

We have also found that the separation of the calcium salt of a phosphate ester from calcium chloride can also be achieved by the use of gel-filtration or ion exclusion.

An example illustrating the manner in which the process is carried out is given hereunder, it being understood that this example is in no way limitative.

Example 1

The following method has been found suitable for the preparation of calcium sucrose monophosphates. Sucrose (350 gram; 1.02 mole) was dissolved in distilled water (1.5 liters) and calcium oxide (140 gram; 2.5 mole) or calcium hydroxide (185 g.; 2.5 mole) was suspended in the solution, which was then mixed and cooled to 0° C. A solution of phosphorus oxychloride (153.4 gram; 1.0 mole) dissolved in trichloroethylene (150 ml.) was added slowly, while vigorously agitating the reaction mixture in a cooling bath maintaining the temperature at approximately 0° C. Time required for the addition was approximately 3 hours.

After completion of the reaction, the reaction mixture was centrifuged or filtered and the filtrate concentrated to approximately 60% solids. The product was obtained by adding this concentrate slowly with vigorous agitation to sufficient ethanol to yield a final concentration of 80% ethanol by volume. The calcium sucrose phosphate was precipitated as a fine white powder. After agitation for 30 minutes, this product was filtered off and dried. At this stage the product contained approximately 12% by weight of calcium chloride. To obtain a product free of calcium chloride it was necessary to repeat this precipitation procedure five or six more times.

Instead of using this multi precipitation procedure for the removal of calcium chloride, it was found possible to extract this calcium chloride from the first precipitate calcium sucrose phosphate, by extraction with 70–80% by volume ethanol in aqueous solution. In this procedure the solid product was vigorously mixed with 2–5 times its weight of aqueous ethanol for 30 minutes. Five extractions were found to be sufficient to obtain a product free from calcium chloride. The efficiency of calcium chloride removal was increased by using more dilute ethanol solutions and larger volumes for each extraction. However, this leads to too great a loss of organic phosphates and too great a consumption of ethanol. The final yield of calcium sucrose phosphates was approximately 80% of the theoretical yield.

Instead of concentration of the reaction mixture before the original precipitation step, the product can be precipitated from the reaction mixture by adding ethanol to the reaction mixture with vigorous agitation, to obtain a final ethanol concentration of 80% by volume.

The following ranges of reaction conditions have been proved:
(I) Concentration of sugar in reaction mixture: 12.0 g./100 g. water to 24.0 g./100 g. water.
(II) Temperature of reaction: 0° C. to 15° C.
(III) Composition of TCE/POCl₃ mixture (TCE=trichloroethylene): 1 part TCE to 1 part POCl₃ by weight to 1 part TCE to 0.2 part POCl₃ by weight.
(IV) Time of addition of TCE/POCl₃ mixture: 3 hours to 8 hours.
(V) Degree of agitation: Approximately 10 h.p./1,000 gallons to probably less than 1 h.p./1,000 gallons (slow agitation).

These ranges of reaction have been taken from a series of experiments carried out to determine the main variables and their effects on the quality of the calcium sucrose phosphate produced. The products obtained from these reactions were similar and consist of from 80–90% of monophosphoric acid esters of sucrose. The main difference between the products was in the amount of inorganic calcium phosphate present in the final product; this ranged from 1–4.5% calculated as phosphorus on the total weight of product.

Factors influencing the amount of inorganic calcium phosphate present are:
(1) Reaction temperature: low temperatures (for example, 0° C.) favour a decrease in the amount of inorganic phosphate formed.
(2) Concentration of TCE/POCl₃ mixture: decreasing the concentration of POCl₃ in TCE decreases the amount of inorganic phosphate formed.
(3) Purity of POCl₃ used: redistillation of the POCl₃ before use decreases the amount of inorganic phosphate formed.
(4) Agitation of reaction mixture: when the agitation of the reaction mixture is decreased, the amount of inorganic phosphate formed increases considerably.

The processes can be carried out in a batch system, or a continuous process can be used. Irrespective of whether a batch or a continuous process is used vigorous agitation during the reaction, precipitation and extraction stages, is essential for good yields of the pure salts.

Other salts of phosphoric esters made by this process may be obtained from the calcium salt by conventional techniques. A process which we have found to be satisfactory consists of passing an aqueous solution of the calcium salt through a cation exchange resin in the hydrogen form. Calcium is retained on the resin and the phosphoric ester which passes through the column may be neutralized with a suitable base containing the appropriate metal, such as for example sodium hydroxide.

An example illustrates the procedure.

Example 2

A 2% by weight aqueous solution of calcium sucrose phosphate was passed through a column of cation exchange resin (Dowex 50). The effluent from this column was neutralized with sodium carbonate in slight excess.

The solution was then concentrated and the sodium salt of sucrose phosphate was crystallized by the slow addition of ethanol. The product was recrystallized from aqueous ethanol to yield a white powder which was pure sodium sucrose phosphate.

While not limited thereto the invention is particularly applicable to the manufacture of the calcium salts of phosphate esters of carbohydrates or polyhydric alcohols such as mannitol, sorbitol, dihydroxyacetone, glycerol, galactose, arabinose, ribose, xylose, maltose, lactose, raffinose and glucose. The following examples show the application of this invention to a selection of these carbohydrates and polyhydric alcohols.

The final phase, namely the separation of the esters, is carried out in these examples as aforesaid but the description of the separation is not repeated hereunder.

In Examples 3–7, yields which are expressed as a percentage of theoretical are with respect to equations similar to the equation quoted herein in relation to the manufacture of calcium sucrose monophosphate.

Example 3.—Maltose monophosphate esters (I)

| | | |
|---|---|---|
| Maltose (1.02 mole) | g | [1]350 |
| CaO (2.5 mole) | g | [1]140 |
| Water | ml | [1]2000 |

(II)

| | | |
|---|---|---|
| POCl$_3$ (1.0 mole) | g | [2]153.4 |
| Trichloroethylene (or chloroform) | g | [2]290 |

[1] Mixed and cooled to 0° C.
[2] Mixed and added to (I) at 0° C., with agitation as in Example 1.

Yield of maltose monophosphate esters was 60% of the maltose used (approximately 50% of theoretical), i.e. approximately 65% of phosphorus in phosphorus oxychloride was converted to maltose monophosphate esters.

The final product contained 2% phosphorus as inorganic calcium phosphate.

Example 4.—Mannitol, sorbitol phosphate esters (I)

| | | |
|---|---|---|
| Mannitol (or sorbitol) (Anhydrous) (0.036 mole) | g | [1]9.1 |
| CaCO$_3$ (0.1 mole) | g | [1]10.0 |
| Water | ml | [1]100 |

(II)

| | | |
|---|---|---|
| POCl$_3$ (0.05 mole) | g | [2]7.6 |
| Trichloroethylene | g | [2]15 |

[1] Mixed and cooled to 0° C.
[2] Mixed and added to (I) at 0° C., with agitation as in Example 1.

Yield of sorbitol (or mannitol) monophosphate esters was approximately 70% of the alcohol used (approximately 45% of theoretical).

The final product contained 2% phosphorus as inorganic phosphate.

Example 5.—Lactose monophosphate esters (I)

| | | |
|---|---|---|
| Lactose (1.02 mole) | g | [1]350 |
| CaO (2.5 mole) | g | [1]140 |
| Water | g | [1]3000 |

(II)

| | | |
|---|---|---|
| POCl$_3$ (1.0 mole) | g | [2]153.4 |
| Trichloroethylene | g | [2]290 |

[1] Mixed and cooled to 0° C.
[2] Mixed and added to (I) at 0° C., with agitation as in Example 1.

Time of addition 3 hours.

Yield of lactose monophosphate esters approximately 50% of the lactose used (approximately 40% of theoretical).

The final product contained approximately 2% phosphorus as inorganic calcium phosphate.

Example 6.—Galactose monophosphate esters (I)

| | | |
|---|---|---|
| Galactose (1.0 mole) | g | [1]180 |
| CaO (2.5 mole) | g | [1]140 |
| Water | ml | [1]1500 |

(II)

| | | |
|---|---|---|
| POCl$_3$ (1.0 mole) | g | [2]153.4 |
| Trichloroethylene | g | [2]290 |

[1] Mixed and cooled to 0° C.
[2] Mixed and added to (I) at 0° C., with agitation as in Example 1.

Time of addition 3 hours.

Yield of galactose monophosphate esters was approximately 20% of the galactose used (approximately 45% of theoretical).

The final product contained approximately 3% phosphorus as inorganic calcium phosphate.

Example 7.—Arabinose monophosphoric acid esters (I)

| | | |
|---|---|---|
| Arabinose (0.08 mole) | g | [1]12.0 |
| CaO (0.20 mole) | g | [1]11.2 |
| Water | ml | [1]200 |

(II)

| | | |
|---|---|---|
| POCl$_3$ (0.08 mole) | g | [2]12.2 |
| Trichloroethylene | g | [2]37 |

[1] Mixed and cooled to 0° C.
[2] Mixed and added to (I) at 0° C., with agitation as in Example 1.

Time of addition 1 hour.

Yield of arabinose monophosphoric acid esters was 75% of the arabinose used (approximately 45% of theoretical).

The final product contained 2% phosphorus as inorganic calcium phosphate.

Example 8.—Fructose phosphate esters (I)

| | | |
|---|---|---|
| Fructose (1.0 mole) | g | [1]180 |
| CaCO$_3$ (2.5 mole) | g | [1]250 |
| Water | ml | [1]1500 |

(II)

| | | |
|---|---|---|
| POCl$_3$ (1.0 mole) | g | [2]153.4 |
| Trichloroethylene | g | [2]290 |

[1] Mixed and cooled to 0° C.
[2] Mixed and added to (I) at 0° C., with agitation as in Example 1.

Time of addition 3 hours.

Approximately 50% of the fructose was converted to fructose phosphate esters (mainly fructose diphosphate).

Examples 9 and 10.—Ribose and xylose phosphate esters

Ribose (12 g.) was dissolved in 0.2 litre of distilled water and the solution was cooled to 0° C. Calcium hydroxide (14.8 g.) was added and the mixture was vigorously agitated at 0° C. A mixture of phosphorus oxychloride (12.2 g.) dissolved in trichloroethylene (25 ml.) was added slowly over a period of 2 hours, with vigorous agitation at 0° C. The mixture is agitated for a further one hour, then filtered to remove a slight precipitate that had formed. The filtrate was concentrated under vacuum at 45° C., removing approximately 170 ml. of water. The concentrate was poured slowly into 0.5 litre of ethanol with vigorous agitation. The precipitate was stirred for 15 minutes and filtered off. To obtain a product completely free from calcium chloride five precipitations were required. The product was identified as a complex association of ribose phosphates and inorganic calcium phosphate.

Using an identical procedure in all respects, this preparation was repeated using xylose instead of ribose. The yield in each case was approximately 9 g.

| Typical Analysis | Complex comprising ribose phosphates, percent | Complex comprising xylose phosphates, percent |
| --- | --- | --- |
| Ca total | 18.05 | 19.28 |
| P total | 11.48 | 15.56 |
| P inorganic | 3.84 | 5.65 |

From the foregoing it is apparent that we are able to obtain the objects of our invention and provide a new and useful process for the manufacture of phosphoric esters of carbohydrates and of polyhydric alcohols by phosphorylating the carbohydrate or polyhydric alcohol in the presence of a calcium oxy-compound at low temperature. The examples given are illustrative of the application of the process to a variety of carbohydrates and polyhydric alcohols.

We claim:

1. A process for the manufacture of phosphoric esters of carbohydrates which comprises mixing a carbohydrate with water and an inorganic calcium oxy-compound selected from the group consisting of calcium oxide, calcium hydroxide and calcium carbonate, phosphorylating said mixture at a temperature of between about 0° C. and 15° C. with phosphorus oxychloride dissolved in chlorinated hydrocarbon solvent, then recovering the calcium salt of the phosphate ester from the reaction medium; said process being characterized in that the carbohydrate, inorganic calcium oxy-compound and phosphorus oxychloride are employed respectively in the molar ratios approximately 1:2.5:1.

2. A process for the manufacture of phosphoric esters of carbohydrates according to claim 1, wherein the carbohydrate is a sugar.

3. A process for the manufacture of phosphoric esters of carbohydrates according to claim 1, wherein the carbohydrate is selected from the group consisting of sucrose, galactose, maltose, lactose, glucose, ribose, and xylose.

4. A process for the manufacture of phosphoric esters of carbohydrates according to claim 1, wherein said mixture is phosphorylated at a temperature of the order of 0° C.

5. A process for the manufacture of phosphoric esters of carbonates according to claim 1, wherein said chlorinated hydrocarbon solvent is trichloroethylene.

6. A process for the manufacture of phosphoric esters of carbohydrates according to claim 1, wherein the calcium salt of the phosphate ester is separated from calcium chloride by counter current extraction using an alcohol selected from the group consisting of anhydrous alcohol and hydrous alcohol.

7. A process for the manufacture of phosphoric esters of carbohydrates according to claim 6, wherein the alcohol is a hydrous ethanol consisting of between about 70% and 80% by volume ethanol in aqueous solution.

8. A process for the manufacture of phosphoric esters of carbohydrates according to claim 1, wherein the calcium salt of the phosphate ester is separated from calcium chloride by a process of gel-filtration.

9. A process for the manufacture of phosphoric esters of carbohydrates according to claim 1, wherein the calcium salt of the phosphate ester is separated from calcium chloride by a process of ion exclusion.

10. A process for the manufacture of phosphoric esters of polyhydric alcohols, said process comprising mixing a polyhydric alcohol with water and an inorganic calcium oxy-compound selected from the group consisting of calcium oxide, calcium hydroxide and calcium carbonate, phosphorylating said mixture at a temperature of between about 0° C. and 15° C. with phosphorus oxychloride dissolved in chlorinated hydrocarbon solvent, then recovering the calcium salt of the phosphate ester from the reaction medium; said process being characterized in that the polyhydric alcohol; inorganic calcium oxy-compound and phosphorus oxychloride are employed respectively in the molar ratios approximately 1:2.5:1.

11. A process for the manufacture of phosphoric esters of polyhydric alcohols according to claim 10, wherein the chlorinated hydrocarbon solvent is trichloroethylene.

12. A process for the manufacture of phosphoric esters of polyhydric alcohols according to claim 10, wherein the polyhydric alcohol is selected from the group consisting of mannitol, sorbitol, and glycerol.

13. A process for the manufacture of phosphoric esters of polyhydric alcohols according to claim 10, wherein said mixture is phosphorylated at a temperature of the order of 0° C.

14. A process for the manufacture of phosphoric esters of polyhydric alcohols according to claim 10, wherein the calcium salt of the phosphate ester is separated from calcium chloride by counter current extraction using an alcohol selected from the group consisting of anhydrous alcohol and hydrous alcohol.

15. A process for the manufacture of phosphate esters of polyhydric alcohols according to claim 14, wherein the alcohol is a hydrous ethanol consisting of between about 70% and 80% by volume ethanol in aqueous solution.

References Cited

UNITED STATES PATENTS 3,013,991  12/1961  Fierce et al. _____ 260—975

FOREIGN PATENTS 247,809  6/1912  Germany.

LEWIS GOTTS, Primary Examiner.

JOHNNIE R. BROWN, Assistant Examiner.

U.S. Cl. X.R.

260—975